(12) United States Patent
Ogawa et al.

(10) Patent No.: US 11,281,001 B2
(45) Date of Patent: Mar. 22, 2022

(54) INDEX CALCULATION APPARATUS AND DISPLAY SYSTEM

(71) Applicant: DENSO CORPORATION, Kariya (JP)

(72) Inventors: Hiroaki Ogawa, Kariya (JP); Takeshi Enya, Kariya (JP)

(73) Assignee: DENSO CORPORATION, Kariya (JP)

( * ) Notice: Subject to any disclaimer, the term of this patent is extended or adjusted under 35 U.S.C. 154(b) by 192 days.

(21) Appl. No.: 16/808,728

(22) Filed: Mar. 4, 2020

(65) Prior Publication Data

US 2020/0285052 A1    Sep. 10, 2020

(30) Foreign Application Priority Data

Mar. 6, 2019   (JP) .............................. JP2019-040749

(51) Int. Cl.
  *G02B 27/01*   (2006.01)
  *G06F 17/11*   (2006.01)
  *G06K 9/00*    (2006.01)

(52) U.S. Cl.
  CPC .......... *G02B 27/0101* (2013.01); *G06F 17/11* (2013.01); *G06K 9/00791* (2013.01); *G02B 2027/0116* (2013.01)

(58) Field of Classification Search
  CPC ........ G02B 27/0101; G02B 2027/0116; G02B 2027/0118; G06F 17/11; G06K 9/00791
  See application file for complete search history.

(56) References Cited

U.S. PATENT DOCUMENTS

| | | | |
|---|---|---|---|
| 2005/0099546 A1* | 5/2005 | Zhu | H04N 9/68 348/645 |
| 2017/0290504 A1* | 10/2017 | Khaderi | A61B 5/165 |
| 2018/0190019 A1* | 7/2018 | Glynn | G06T 11/60 |
| 2018/0335633 A1 | 11/2018 | Naruse | |
| 2019/0004313 A1* | 1/2019 | Kusafuka | G02B 27/01 |
| 2019/0068929 A1* | 2/2019 | Sato | H04N 9/04553 |
| 2020/0355917 A1 | 11/2020 | Ogawa et al. | |

FOREIGN PATENT DOCUMENTS

JP    2017-097759 A    6/2017

* cited by examiner

*Primary Examiner* — Brent D Castiaux
(74) *Attorney, Agent, or Firm* — Maschoff Brennan

(57) ABSTRACT

An index calculation apparatus is provided with a luminance acquiring unit, a chromaticity acquiring unit and an index calculation unit. The luminance acquiring unit is configured to acquire a luminance Y of an evaluation object of visibility. The chromaticity acquiring unit is configured to acquire a chromaticity U of the evaluation object. The index calculation unit is configured to calculate an index V expressed by following equation by using the luminance Y and the chromaticity U·V=KYU . . . (1), where K is a constant.

6 Claims, 12 Drawing Sheets

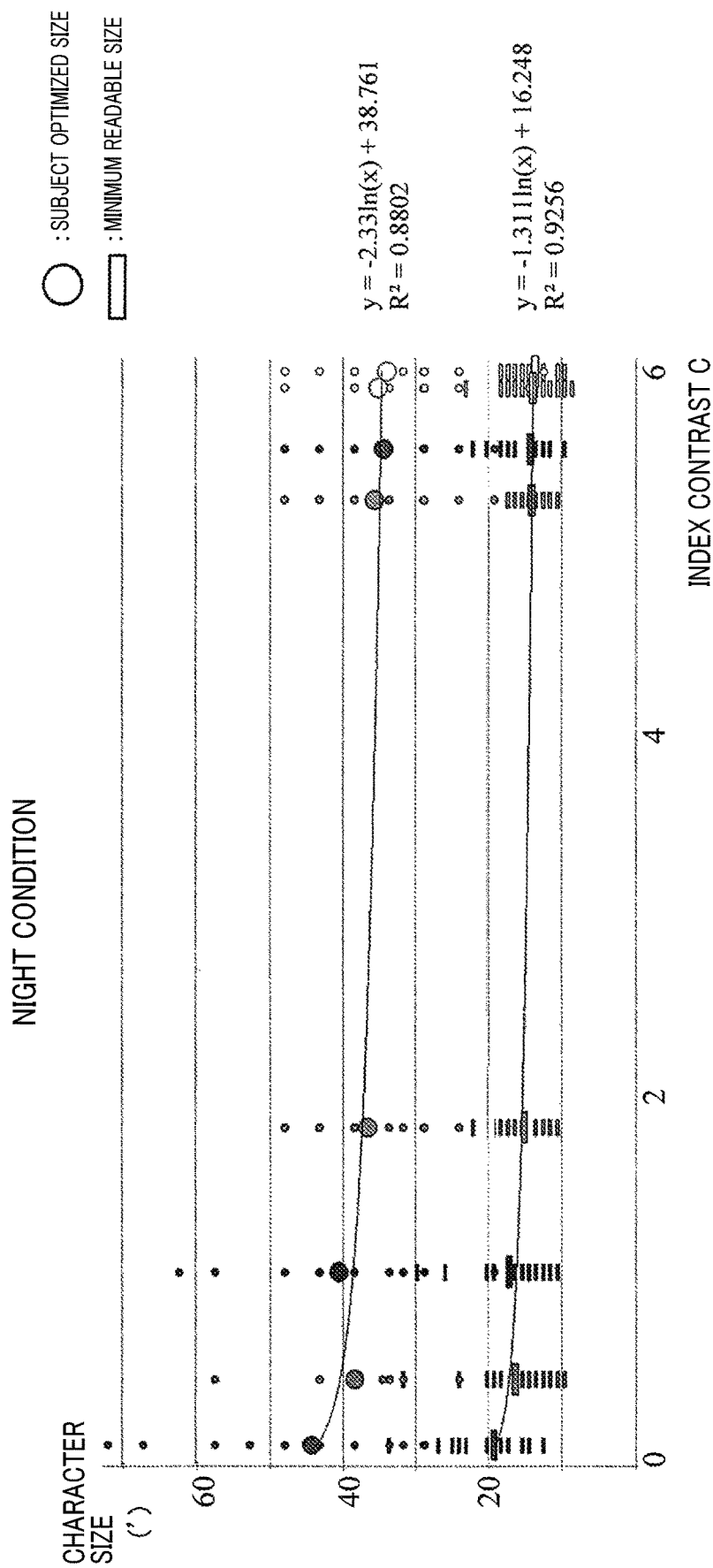

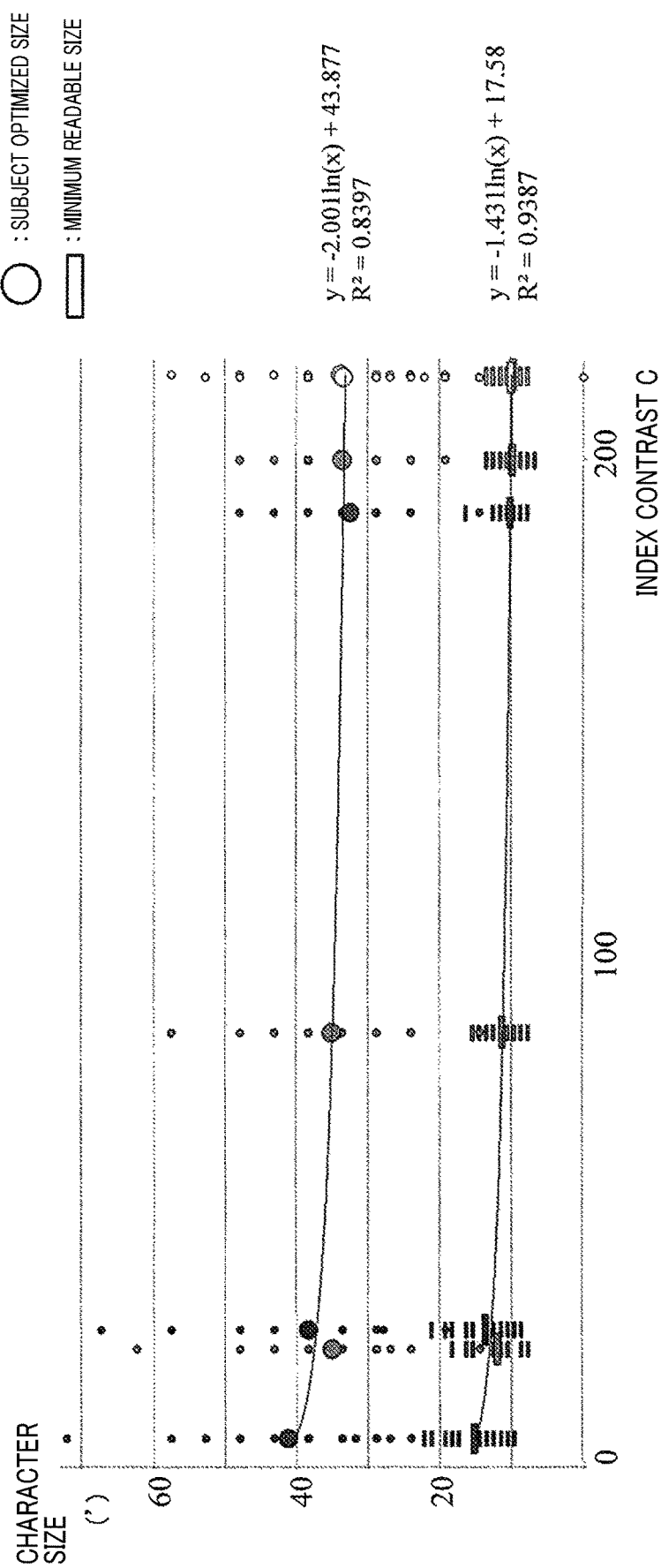

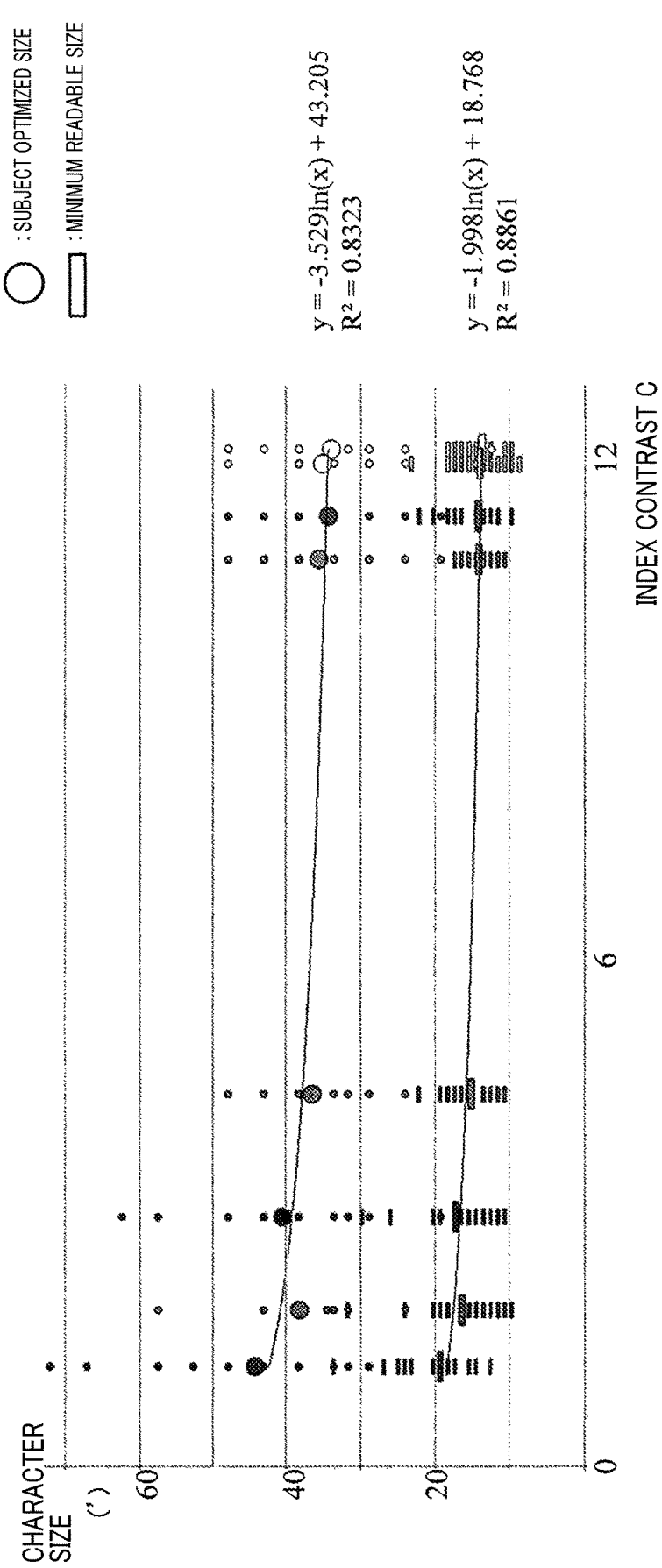

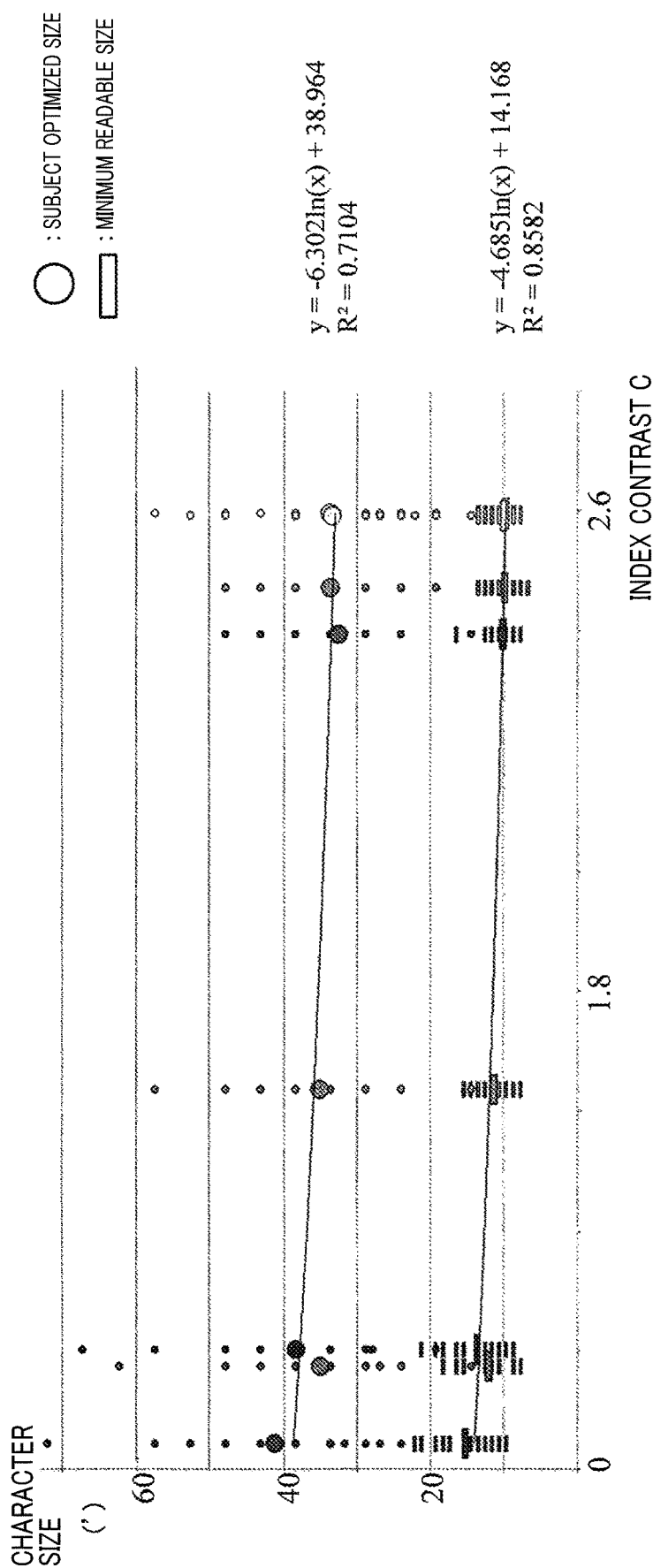

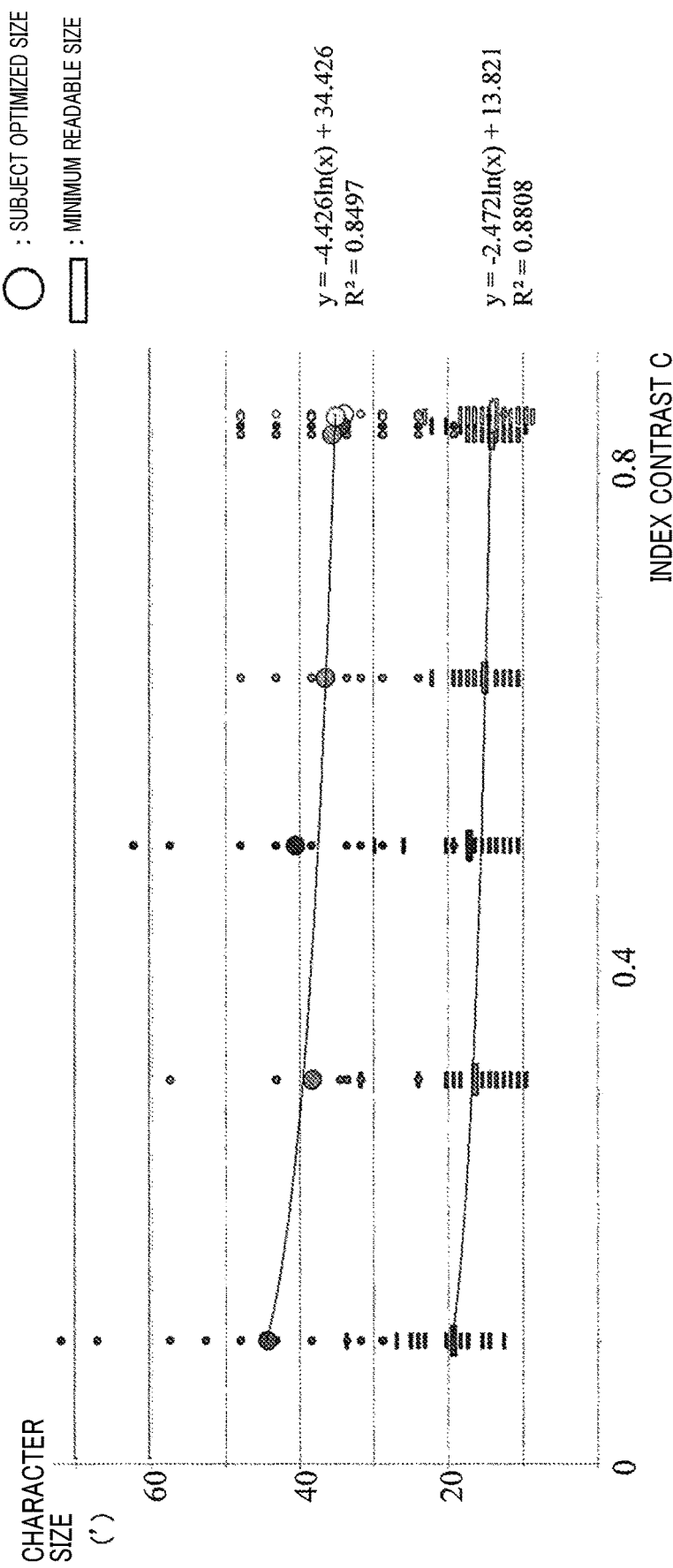

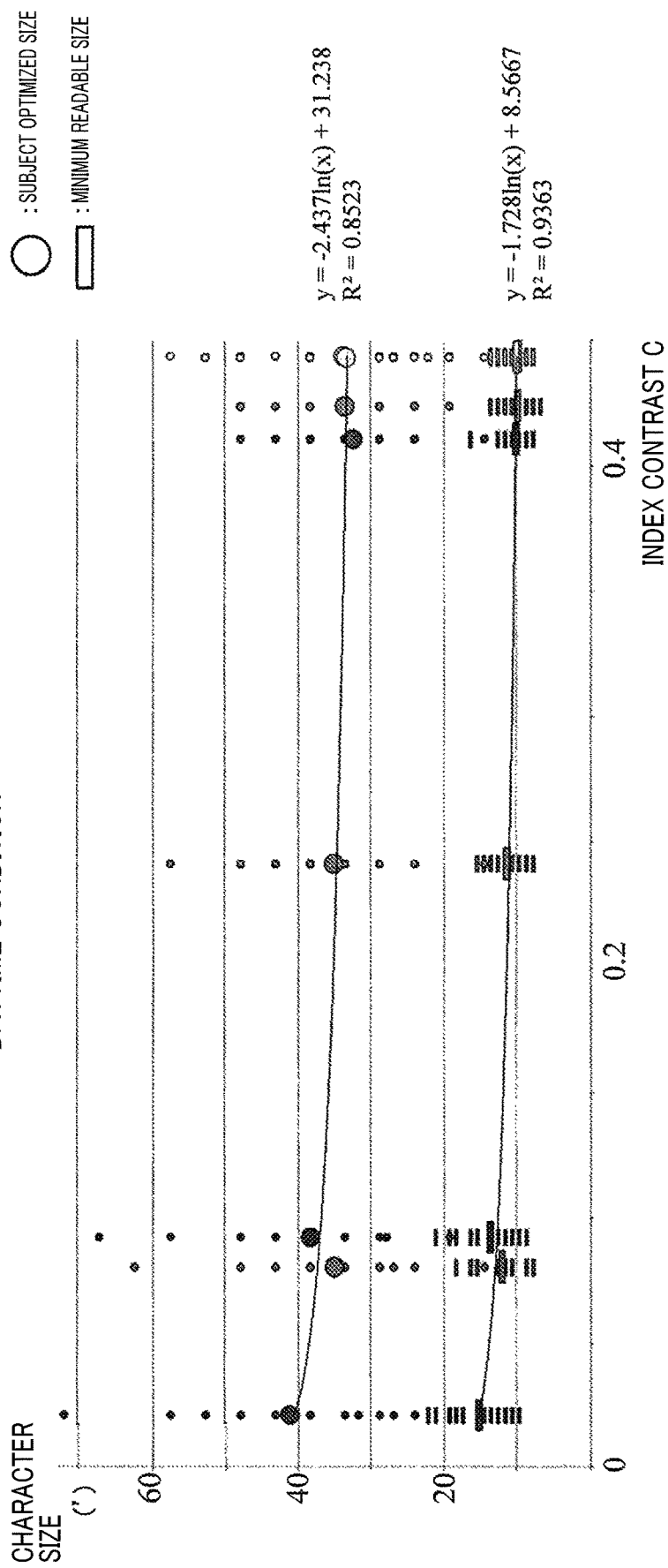

INDEX CALCULATION APPARATUS AND DISPLAY SYSTEM

CROSS-REFERENCE TO RELATED APPLICATION

This application is based on and claims the benefit of priority from earlier Japanese Patent Application No. 2019-40749 filed Mar. 6, 2019, the description of which is incorporated herein by reference.

BACKGROUND

Technical Field

The present disclosure relates to an index calculation apparatus and a display system.

Description of the Related Art

Conventionally, a head up display (hereinafter referred to as HUD) is known. For example, a patent literature discloses HUD. The HUD is able to display a visual object such as characters. The background of the visual object is scenery around the vehicle.

SUMMARY

As one aspect of the present disclosure, an index calculation apparatus and a display system capable of calculating an index representing the visibility of the visual object are provided.

Specifically, the present disclosure provides, as one aspect, an index calculation apparatus including a luminance acquiring unit configured to acquire a luminance Y of an evaluation object of visibility; a chromaticity acquiring unit configured to acquire a chromaticity U of the evaluation object; and an index calculation unit configured to calculate an index V expressed by following equation by using the luminance Y and the chromaticity U.

$$V = KYU \quad (1),$$

where K is a constant.

BRIEF DESCRIPTION OF THE DRAWINGS

In the accompanying drawings:

FIG. 7 is a graph showing a relationship between an index contrast expressed by an equation (2) and a night condition based on a subject optimized size and a minimum readable size;

FIG. 8 is a graph showing a relationship between an index contrast expressed by an equation (2) and a daytime condition based on a subject optimized size and a minimum readable size;

FIG. 9 is a graph showing a relationship between an index contrast expressed by an equation (3) and a night condition based on a subject optimized size and a minimum readable size;

FIG. 10 is a graph showing a relationship between an index contrast expressed by an equation (3) and a daytime condition based on a subject optimized size and a minimum readable size;

FIG. 11 is a graph showing a relationship between an index contrast expressed by an equation (4) and a night condition based on a subject optimized size and a minimum readable size; and FIG. 12 is a graph showing a relationship between an index contrast expressed by an equation (4) and a daytime condition based on a subject optimized size and a minimum readable size.

DETAILED DESCRIPTION OF THE PREFERRED EMBODIMENTS

According to the above-mentioned conventional art, a patent literature JP-A-2017-97759 discloses HUD. The HUD is able to display a visual object such as characters. The background of the visual object is scenery around the vehicle.

The visibility of the visual object varies depending on the luminance and the chromaticity of the visual object and the background. In this respect, a state of display for the visual object may be set depending on the luminance and the chromaticity of the visual object and the background in order to secure the visibility of the visual object. In order to appropriately set the condition of a display of the visual object, an index of the visibility of the visual object needs to be calculated. In this respect, the present disclosure provides an index calculation apparatus and a display system capable of calculating an index representing the visibility of the visual object are provided.

With reference to the drawings, exemplary embodiments of the present disclosure will be described.

First Embodiment

Figure 1:
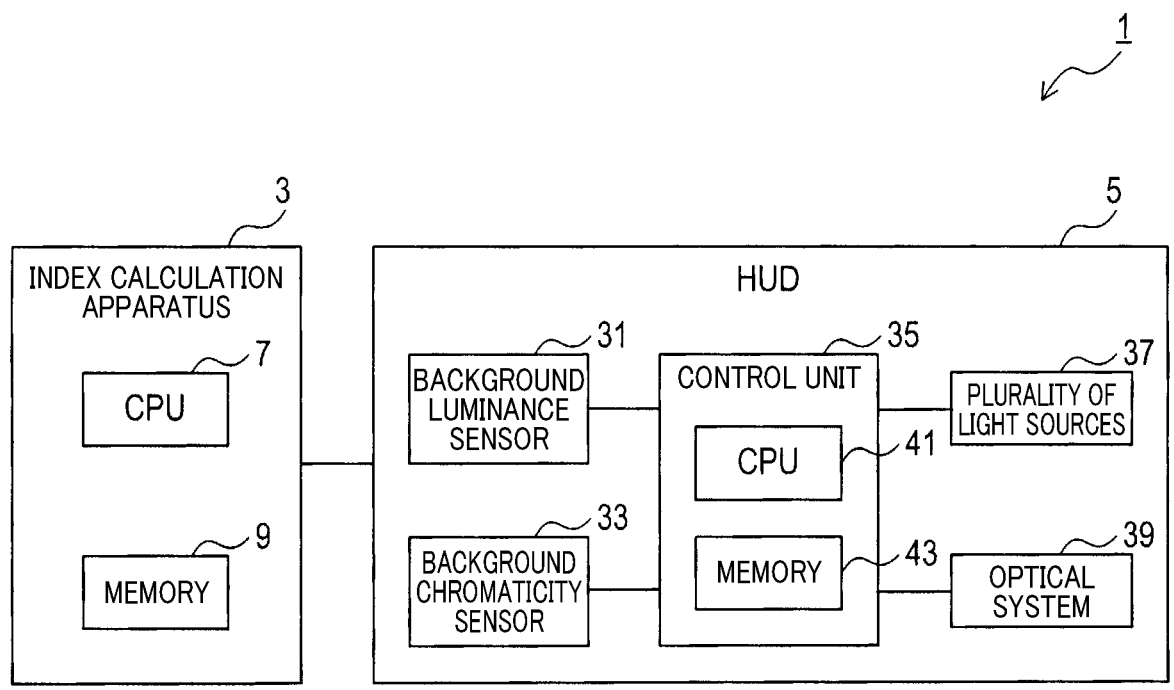
FIG. 1 is a block diagram showing a configuration of a display system of the present disclosure.

A configuration of a display system 1 will be described with reference to FIGS. 1 to 3 and 6. The display system 1 is mounted on a vehicle for example. As shown in FIG. 1, the display system 1 is provided with an index calculation apparatus 3 and a HUD 5. The HUD 5 corresponds to the display apparatus.

The index calculation apparatus 3 is provided with a microprocessor including CPU 7, and a semiconductor memory unit such as RAM or ROM (hereinafter referred to as memory 9). Each function of the index calculation apparatus 3 is accomplished by the CPU 7 executing the program stored in a non-transitory tangible recording media. In this example, the memory 9 corresponds to the non-transitory tangible recording media storing the program. Also, by executing the program, a method corresponding to the program is executed. Note that the index calculation apparatus 3 may include a single microprocessor or a plurality of microprocessors.

Figure 2:
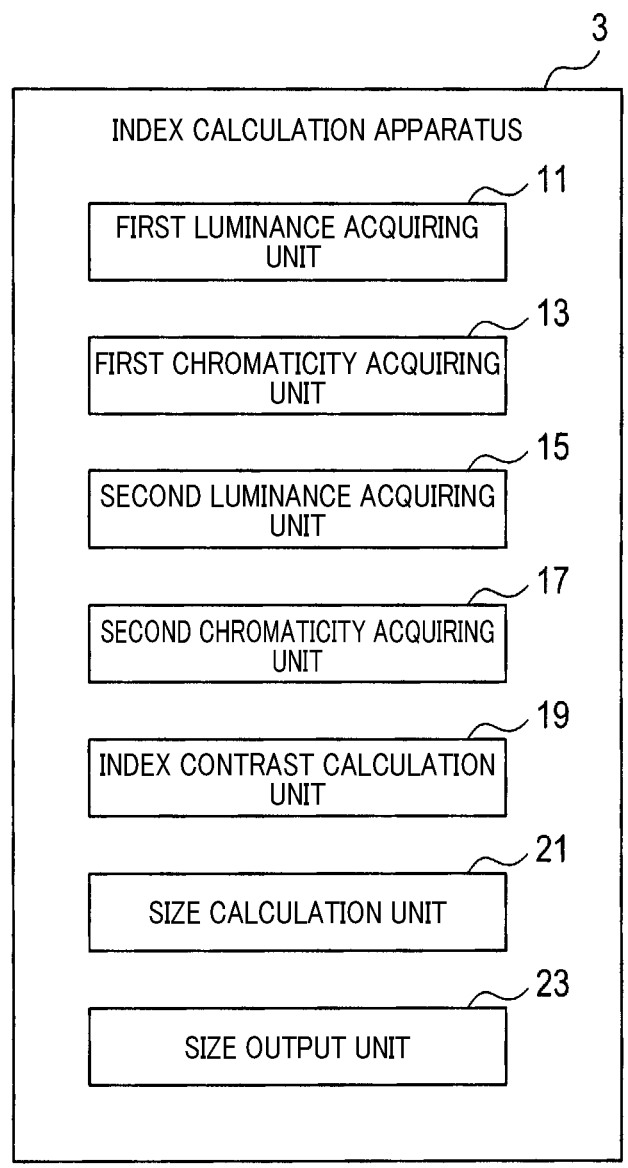
FIG. 2 is a block diagram showing a functional configuration of an index calculation apparatus.

As shown in FIG. 2, the index calculation apparatus 3 is provided with a first luminance acquiring unit 11, a first chromaticity acquiring unit 13, a second luminance acquiring unit 15, a second chromaticity acquiring unit 17, an index contrast calculation unit 19, a size calculation unit 21 and a size output unit 23.

The first luminance acquiring unit 11 and the second luminance acquiring unit 15 correspond to a luminance acquiring unit. The first chromaticity acquiring unit 13 and the second chromaticity acquiring unit 17 correspond to a chromaticity acquiring unit. The index contrast calculation unit 19 corresponds to an index calculation unit.

Figure 6:
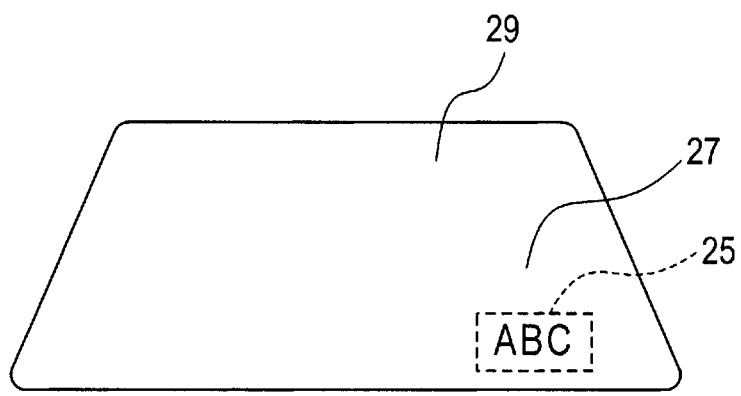
FIG. 6 is an explanatory diagram showing a visible object and a background when viewed from a vehicle cabin.

Similar to publicly known HUD, the HUD 5 is able to display the visual object 25 as shown in FIG. 6. The visual object 25 is a display object displayed by the HUD 25. The driver of the vehicle is able to recognize the visual object 25. A background 27 exists around the visual object 25. The background is, for example, a portion located around the visual object 25 among the scenery ahead of the vehicle which can be seen by the drive through the windshield 29. The visual object 25 includes, for example, characters which includes arrows, circles and crosses.

As shown in FIG. 1, the HUD 5 is provided with a background luminance sensor 31, a background chromaticity sensor 33, a control unit 35, a plurality of light sources 37 and an optical system 39. The background luminance sensor 31 is a sensor that detects a second luminance y2 as a luminance of the background 27.

The background chromaticity sensor 33 detects the second chromaticity U2 as a chromaticity of the background 27. The second chromaticity U2 refers to a u' value of the CIE 1976 USC chromaticity diagram. The control unit 35 includes a microprocessor having a CPU 41, and a semiconductor memory (hereinafter referred to as memory 43) such as RAM or ROM.

Each function of the control unit 35 is accomplished by the CPU 41 executing a program stored in a non-transitory tangible recording media. In this example, the memory 43 corresponds to the non-transitory tangible recording media. Also, a method corresponding to the program is executed by executing the program. Note that the control unit 35 may include a single microprocessor or a plurality of microprocessors.

Figure 3:
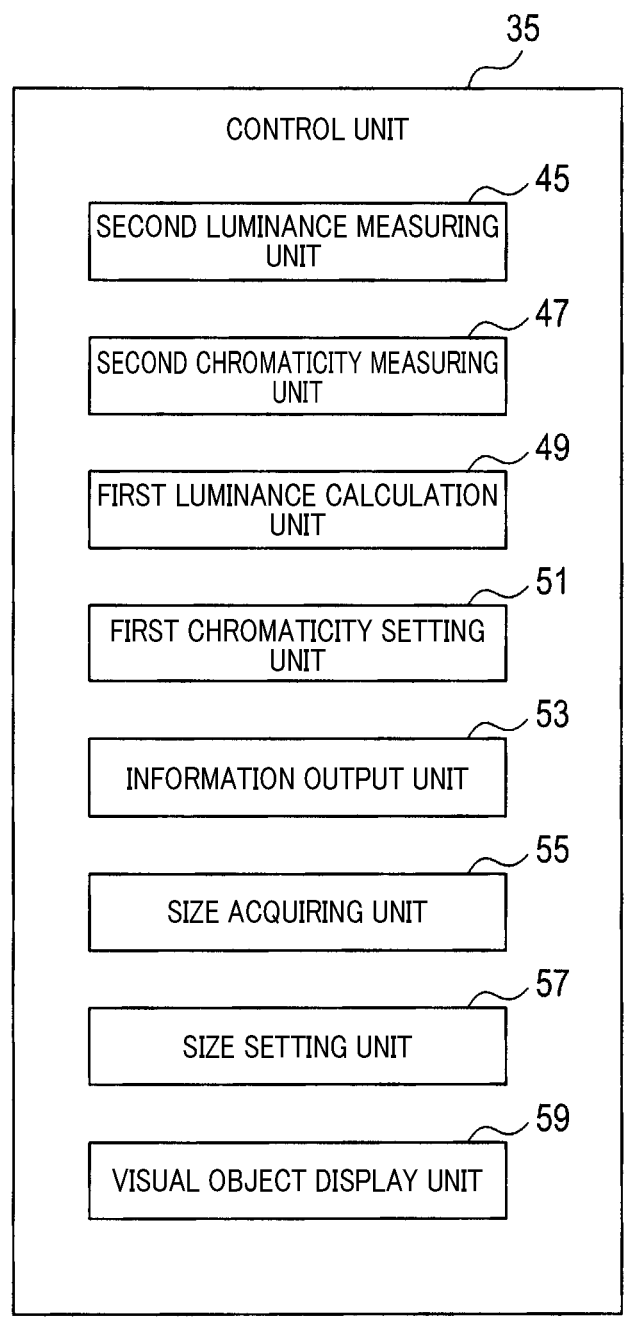
FIG. 3 is a block diagram showing a functional configuration of a control unit.

As shown in FIG. 3, the control unit 35 is provided with a second luminance measuring unit 45, a second chromaticity measuring unit 47, a first luminance measuring unit 49, a first chromaticity setting unit 51, an information output unit 53, a size acquiring unit 55, a size setting unit 57 and a visual object display unit 59.

The plurality of light sources 37 and the optical system 39 are used for displaying the visual object 25. The respective light sources produce different colors of the light. The visual object 25 is displayed by mixing a plurality of colors of the light sources.

Figure 4:
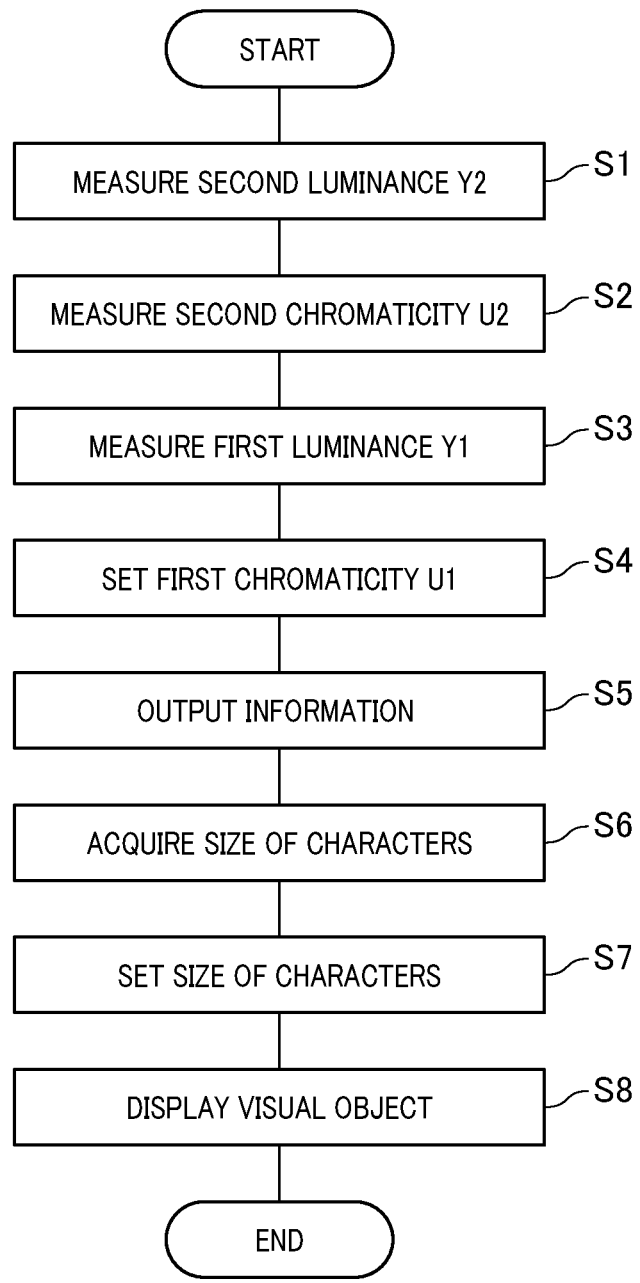
FIG. 4 is a flowchart showing a process executed by a HUD.

A process executed by the HUD 5 will be described with reference to FIG. 4. At step S1, the second luminance measuring unit 45 measures the second luminance Y2 by using the background luminance sensor 31.

At step S2, the second chromaticity measuring unit 47 measures the second chromaticity U2 by using the background chromaticity sensor 33. At step S3, the first luminance calculation unit 49 calculates the first luminance Y1. The first luminance Y1 is an luminance of the visual object 25 displayed in step S8 which will be described later.

A first table that defines a relationship between the second luminance Y2 and the first luminance Y1 is stored in the memory 43. The relationship defined by the first table is defined such that the higher the second luminance Y2, the higher the first luminance Y1. The first luminance calculation unit 49 calculates the first luminance Y1 by applying the second luminance Y2 calculated at step S1 into the first table.

At step S4, the first chromaticity setting unit 51 sets the first chromaticity U1. The first chromaticity U1 is a chromaticity of the visual object 25 displayed at step S8 which will be described later. The first chromaticity U1 refers to the u' value of CIE1976USC chromaticity diagram. The first chromaticity setting unit 5 sets the first chromaticity U1 by using the program stored in the memory 43.

At step S5, the information output unit 53 outputs information to the index calculation apparatus 3. The information to be outputted to the index calculation apparatus 3 includes the second luminance Y2 measured at step S1, the second chromaticity U2 measured at step S2, the first luminance Y1 calculated at step S3 and the first chromaticity U1 set at step S4.

At step S6, the size acquiring unit 55 acquires the size of characters from the index calculation apparatus 3. The characters are included in the visual object 25 displayed at step S8 which will be described later. The size of the characters corresponds to the size of the characters outputted by the index calculation apparatus 3 at step S19 which will be described later.

At step S7, the size setting unit 57 sets the size of the characters. The size of the characters is the size of the characters acquired at step S6. At step S8, the visual object display unit 59 displays the display object 25. At this time, the visual object display unit 59 sets the size of the characters included in the visual object 25 to be the same as the size of the characters set at step S7. Also, the visual object display unit 59 sets the luminance of the visual object 25 to be the first luminance Y1 calculated at step S3. The visual object display unit 59 sets the chromaticity of the visual object 25 to be the first chromaticity U1 which has been set at step S4. The luminance of the characters included in the visual object 25 is the first luminance Y1. The chromaticity of the characters included in the visual object 25 is the first chromaticity U1.

Figure 5:
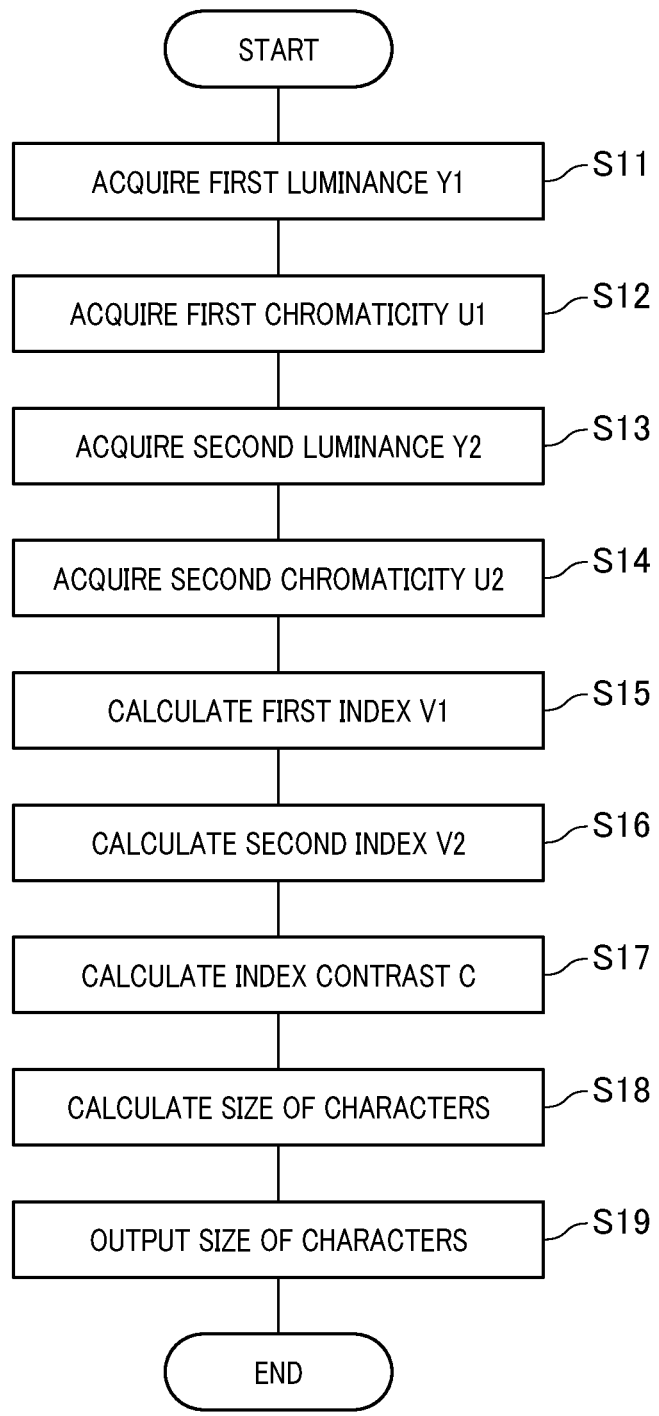
FIG. 5 is a flowchart showing a process executed by the index calculation apparatus.

A process executed by the index calculation apparatus 3 will be described with reference to FIG. 5. At step S11, the first luminance acquiring unit 11 acquires the first luminance Y1. The first luminance Y1 to be acquired is outputted by the HUD 5 at step S5.

At step S12, the first chromaticity acquiring unit 13 acquires the first chromaticity U1. The first chromaticity U1 to be acquired is a luminance which has been outputted by the HUD 5 at step S5. At step S13, the second luminance acquiring unit 15 acquires the second luminance Y2. The second luminance to be acquired is a luminance which has been outputted by the HUD 5 at step S5.

At step S14, the second chromaticity acquiring unit 17 acquires the second chromaticity U2. The second chromaticity U2 to be acquired is a luminance which has been outputted by the HUDS at step S5. At step S15, the index contrast calculation unit 19 calculates the first index V1 expressed by the following equation (1A).

$$V1 = KY1U1 \tag{1A}$$

V1 in the equation (1A) is obtained by multiplying values K, Y1 and U1. K in the equation (1A) represents a constant. K may be 1 or other value. Y1 in the equation (1A) is the first luminance Y1 acquired at step S11. U1 in the equation (1A) is the first chromaticity U1 acquired at step S12.

V1 is the index V representing the visibility of the visual object 25. The visual object 25 corresponds to an evaluation object of the visibility. V1 is defined such that the larger the absolute value of V1, the higher the visibility of the visual object 25.

$$V2 = KY2U2 \tag{1B}$$

V2 in the equation (1B) is obtained by multiplying values K, Y2 and U2. K in the equation (1B) is a value as same as K in the equation (1A). Y2 in the equation (1B) is the second luminance Y2 acquired at step S13. U2 in the equation (1B) is the second chromaticity U2 acquired at step S14.

V2 is the index V representing the visibility of the background 27. The background 27 corresponds to an evaluation object of the visibility. V2 is defined such that the larger the absolute value of V2, the higher the visibility of the background 27. At step S17, the index contrast calculation unit 19 calculates the index contrast C expressed by the following equation (2) by using the first index V1 calculated at step S14 and the second index V2 calculated at step S16.

$$C = K(Y1U1 - Y2U2) \qquad (2)$$

K in the equation (2) is the same as K in the equations (1A) and (1B). At step S18, the size calculation unit 21 calculates the size of the characters. The second table that defines the relationship between the index contrast C and the size of the characters is stored in the memory 9. The relationship is defined by the second table such that the smaller the absolute value of the index contrast C, the larger the characters are. The size calculation unit 21 calculates the size of the characters by applying the index contrast C calculated at step S17 into the second table.

At step S19, the size calculation unit 23 outputs the size of the characters calculated at step S18 to the HUD 5. Effects and advantages obtained by the display system 1 and the index calculation apparatus 3 will be described.

(1A) The index calculation apparatus 3 is able to calculate the first index V1 and the second index V2. The first index V1 indicates the visibility of the visual object 25. The relationship between the first index V1 and the visibility of the visual object 25 is defined such that the larger the absolute value of the first index V1, the higher the visibility of the visual object 25 is. The second index V2 indicates the visibility of the background 27. The relationship between the second index V2 and the visibility of the background 27 is defined such that the larger the absolute value of the second index V2, the higher the visibility of the background 27 is.

(1B) The index calculation apparatus 3 is able to calculate the index contrast C expressed by the equation (2). The index contrast C indicates the visibility of the visual object 25. The following test is conducted in order to confirm whether the index contrast C expressed by the equation (2) indicates the visibility of the visible object 25. The second luminance Y2 and the second chromaticity U2 are constant values to be adapted for the background 27 in night time. By changing the first luminance Y1 and the first chromaticity U1 of the visual object 25 including the characters, as shown in FIG. 7, a plurality of index contrasts are accomplished.

In each of the index contrasts C, the size of the characters is changed. Then, a subject optimized size and a minimum readable size are determined for each of the index contrasts C. The subject optimized size refers to the size of characters for the examinee to easiest to read. The minimum readable size refers to minimum character size in a readable range where the examinee is able to read. The subject optimized size and the minimum readable size are each determined as an average value of the measurement values for 19 examinees.

Next, an approximation that defines the relationship between the index contrast C and the subject optimized size is calculated based on the determined subject optimized size. The value $R^2$ in the approximation was 0.8802 which was significantly large. According to the test result, it was confirmed that the index contrast C expressed by the equation (2) indicates the visibility of the visible object 25.

With a condition where the second luminance Y2 and the second chromaticity U2 are constant adapted for the background 27 in the daytime, a test similar to the above-described test was conducted. The test result is shown in FIG. 8. The approximation that defines a relationship between the index contrast C and the subject optimized size was calculated. The value $R^2$ in the approximation was 0.9387 which was significantly large. According to the test result, it was confirmed that the index contrast C expressed by the equation (2) indicates the visibility of the visible object 25.

(1C) The display system 1 is able to set the size of characters depending on the index contrast C. For example, the character size can be changed such that the smaller the absolute value of the index contrast C, the larger the character size is. Hence, even when any of the first luminance Y1, the second luminance Y2 and the second chromaticity U2 changes, the visibility of characters included in the visual object 25 can be secured.

Second Embodiment

Since the second embodiment has the same fundamental configuration as that of the first embodiment, configurations different from those of the first embodiment will be described. The same reference numbers as used in the first embodiment show the same configuration as that of the first embodiment and the description thereof refers to that of the first embodiment.

In the above-described first embodiment, the index contrast C expressed by the equation (2) is calculated. In contrast, according to the second embodiment, the index contrast C expressed by the following equation (3) is calculated.

$$C = (Y1U1)/(Y2U2) \qquad (3)$$

Y1U1 in the equation (3) represents a value in which Y1 is multiplied by U1. Y2U2 in the equation (3) represents a value in which Y2 is multiplied by U2.

Effects and advantages obtained by the display system 1 and the index calculation apparatus 3 will be described. According to the above-described second embodiment, the above-described effects and advantages (1A) and (1C) of the first embodiment can be obtained. Further, the following effects and advantages (2A) can be obtained.

(2A) The index calculation apparatus 3 is able to calculate the index contrast C expressed by the equation (3). The index contrast C indicates the visibility of the visual object 25. The larger the absolute value of the contrast C, the higher the visibility of the visual object 25 is.

A test similar to that of the first embodiment is conducted in order to confirm whether the index contrast C expressed by the equation (3) indicates the visibility of the visible object 25. The test result in the case of the background 27 in the nighttime is shown in FIG. 9. The approximation that defines a relationship between the index contrast C and the subject optimized size was calculated. The value $R^2$ in the approximation was 0.8323 which was significantly large. Also, the approximation that defines a relationship between the index contrast C and the minimum readable size was calculated. The value $R^2$ in the approximation was 0.8861 which was significantly large. According to these test result, it was confirmed that the index contrast C expressed by the equation (3) indicates the visibility of the visible object 25.

The test result in the case of the background 27 in the daytime is shown in FIG. 10. The approximation that defines a relationship between the index contrast C and the subject optimized size was calculated. The value $R^2$ in the approximation was 0.7104 which was significantly large. Also, the approximation that defines a relationship between the index contrast C and the minimum readable size was calculated. The value $R^2$ in the approximation was 0.8582 which was significantly large. According to these test result, it was confirmed that the index contrast C expressed by the equation (3) indicates the visibility of the visible object 25.

Third Embodiment

Since the third embodiment has the same fundamental configuration as that of the first embodiment, configurations different from those of the first embodiment will be described. The same reference numbers as used in the first embodiment show the same configuration as that of the first embodiment and the description thereof refers to that of the first embodiment.

In the above-described first embodiment, the index contrast C expressed by the equation (2) is calculated. In contrast, according to the third embodiment, the index contrast C expressed by the following equation (4) is calculated.

$$C=[(Y1U1)-(Y2U2)]/[(Y1U1)+(Y2U2)] \qquad (4)$$

Y1U1 in the equation (4) refers to a value in which Y1 is multiplied by U1. Y2U2 in the equation (4) refers to a value in which Y2 is multiplied by U2.

Effects and advantages obtained by the display system 1 and the index calculation apparatus 3 will be described. According to the above-described third embodiment, the above-described effects and advantages (1A) and (1C) of the first embodiment can be obtained. Further, the following effects and advantages (3A) can be obtained.

(3A)

The index calculation apparatus 3 is able to calculate the index contrast C expressed by the equation (4). The index contrast C indicates the visibility of the visual object 25. The larger the absolute value of the contrast C, the higher the visibility of the visual object 25 is.

A test similar to that of the first embodiment is conducted in order to confirm whether the index contrast C expressed by the equation (4) indicates the visibility of the visible object 25. The test result in the case of the background 27 in the nighttime is shown in FIG. 11. The approximation that defines a relationship between the index contrast C and the subject optimized size was calculated. The value $R^2$ in the approximation was 0.8497 which was significantly large. Also, the approximation that defines a relationship between the index contrast C and the minimum readable size was calculated. The value $R^2$ in the approximation was 0.8808 which was significantly large. According to these test result, it was confirmed that the index contrast C expressed by the equation (4) indicates the visibility of the visible object 25.

The test result in the case of the background 27 in the daytime is shown in FIG. 12. The approximation that defines a relationship between the index contrast C and the subject optimized size was calculated. The value $R^2$ in the approximation was 0.8523 which was significantly large. Also, the approximation that defines a relationship between the index contrast C and the minimum readable size was calculated. The value $R^2$ in the approximation was 0.9363 which was significantly large. According to these test result, it was confirmed that the index contrast C expressed by the equation (4) indicates the visibility of the visible object 25.

Other Embodiments

The embodiments of the present disclosure have been described. The present disclosure is not limited to the above-described embodiments, but may be modified in various manners.

(1) Other display apparatus may be utilized instead of using the HUD 5. The other display apparatus includes, for example, a liquid crystal display, an organic EL display and a projector apparatus. For example, each of the visual object 25 and the background 27 may be a display object displayed by the same display apparatus.

In the second embodiment, the inverse number of the index contrast C expressed by the equation (3) may be calculated. The value of the index contrast C is defined such that the larger the absolute value of the index contrast C, the lower the visibility of the visual object 25. According to the second embodiment, the size of characters may be calculated depending on the inverse number of the index contrast C. For example, the size of character is set such that the larger the inverse number of the absolute value of the index contrast C, the larger the size of the characters is.

(3) In the third embodiment, the inverse number of the index contrast C expressed by the equation (4) may be calculated. The value of the index contrast C is defined such that the larger the absolute value of the index contrast C, the lower the visibility of the visual object 25. According to the third embodiment, the size of characters may be calculated depending on the inverse number of the index contrast C. For example, the size of character is set such that the larger the inverse number of the absolute value of the index contrast C, the larger the size of the characters is.

(4) The background luminance sensor 31, the background chromaticity sensor 33 may be included in an apparatus other than the HUD 5. For example, the index calculation apparatus 3 may include the background luminance sensor 31 and the background chromaticity sensor 33.

(5) The index calculation apparatus 3 and the method thereof according to the present disclosure may be accomplished by a dedicated computer including a processor and a memory which is programmed such as to execute one or more functions embodied by a computer program. Alternatively, the index calculation apparatus 3 and the method thereof according to the present disclosure may be accomplished by a dedicated computer provided with one or more dedicated hardware circuits (e.g. logic circuits) configuring a processor. Further, the index calculation apparatus 3 and the method thereof according to the present disclosure may be accomplished by one or more dedicated computer constituted of a combination of a processor with a memory configured to execute one or more functions, and a processor composed of one or more hardware circuits. Also, the computer program may be stored, as instruction set to be executed by the computer, into a computer-readable non-transitory tangible recording media. The methods that accomplishes the respective functions included in the index calculation apparatus 3 is not necessary to include the software, but the entire functions may be accomplished by one or more hardware circuits.

(6) A plurality of functions included in a single element of the above-described embodiments may be achieved by a plurality of elements, or one function included in a single element may be achieved by a plurality of elements. A plurality of functions included in a plurality of elements may be achieved by a single element, or a function achieved by a plurality of elements may be achieved by a single element. Also, a part of configurations of the above-described embodiments can be omitted. At least part of the above-described configuration may be added to other configuration of the above-described embodiments, or may replace other configuration of the above-described embodiments.

(7) The present disclosure may be embodied in various manners such as, other than the above-described index calculation apparatus, a system having the index calculation apparatus as an element, a program enabling a computer to serve as the index calculation apparatus, a non-transitory tangible recording media such as a semiconductor memory which stores the program, and an index calculation method, a control method of a display apparatus.

CONCLUSION

As described above, according to the present disclosure, an index calculation apparatus and a display system capable of calculating an index representing the visibility of the visual object are provided.

Specifically, the present disclosure provides, as one aspect, an index calculation apparatus including a luminance acquiring unit configured to acquire a luminance Y of an evaluation object of visibility; a chromaticity acquiring unit configured to acquire a chromaticity U of the evaluation object; and an index calculation unit configured to calculate an index V expressed by following equation (1) by using the luminance Y and the chromaticity U.

$$V=KYU \quad (1),$$

where K is a constant.

The index calculation apparatus according to one aspect of the present disclosure is capable of calculating an index V representing the visibility of the visual object.

As another aspect of the present disclosure, there is provided an index calculation apparatus including: a first luminance acquiring unit configured to acquire a first luminance Y1 which is a luminance of a visual object displayed by a display apparatus; a first chromaticity acquiring unit configured to acquire a first chromaticity U1 which is a chromaticity of the visual object; a second luminance acquiring unit configured to acquire a second luminance Y2 which is a luminance of a background of the visual object; a second chromaticity acquiring unit configured to acquire a second chromaticity U2 which is a chromaticity of the background; and an index contrast calculation unit configured to calculate an index contrast C expressed by following equation (2) by using the first luminance Y1, the second luminance Y2, the first chromaticity U1 and the second chromaticity U2.

$$C=K(Y1U1-Y2U2) \quad (2),$$

where K is constant.

The index calculation apparatus according to another aspect of the present disclosure is capable of calculating the index contrast C representing the visibility of the visible object.

As another aspect of the present disclosure, there is provided an index calculation apparatus including: a first luminance acquiring unit configured to acquire a first luminance Y1 which is a luminance of a visual object displayed by a display apparatus; a first chromaticity acquiring unit configured to acquire a first chromaticity U1 which is a chromaticity of the visual object; a second luminance acquiring unit configured to acquire a second luminance Y2 which is a luminance of a background of the visual object; a second chromaticity acquiring unit configured to acquire a second chromaticity U2 which is a chromaticity of the background; and an index contrast calculation unit configured to calculate an index contrast C expressed by following equation or an inverse of the index contrast C by using the first luminance Y1, the second luminance Y2, the first chromaticity U1 and the second chromaticity U2.

$$C=(Y1U1)/(Y2U2) \quad (3).$$

The index calculation apparatus according to another aspect of the present disclosure is capable of calculating the index contrast C representing the visibility of the visible object.

As another aspect of the present disclosure, there is provided an index calculation apparatus including: a first luminance acquiring unit configured to acquire a first luminance Y1 which is a luminance of a visual object displayed by a display apparatus; a first chromaticity acquiring unit configured to acquire a first chromaticity U1 which is a chromaticity of the visual object; a second luminance acquiring unit configured to acquire a second luminance Y2 which is a luminance of a background of the visual object; a second chromaticity acquiring unit configured to acquire a second chromaticity U2 which is a chromaticity of the background; and an index contrast calculation unit configured to calculate an index contrast C expressed by following equation (4) or an inverse of the index contrast C by using the first luminance Y1, the second luminance Y2, the first chromaticity U1 and the second chromaticity U2.

$$C=[(Y1U1)-(Y2U2)]/[(Y1U1)+(Y2U2)] \quad (4).$$

The index calculation apparatus according to another aspect of the present disclosure is capable of calculating the index contrast C representing the visibility of the visible object.

What is claimed is:

1. An index calculation apparatus comprising:
   a luminance acquiring unit configured to acquire a luminance Y of an evaluation object of visibility;
   a chromaticity acquiring unit configured to acquire a chromaticity U of the evaluation object; and
   an index calculation unit configured to calculate an index V expressed by following equation by using the luminance Y and the chromaticity U, $$V=KYU \quad (1),$$

where K is a constant.

2. An index calculation apparatus comprising:
   a first luminance acquiring unit configured to acquire a first luminance Y1 which is a luminance of a visual object displayed by a display apparatus;
   a first chromaticity acquiring unit configured to acquire a first chromaticity U1 which is a chromaticity of the visual object;
   a second luminance acquiring unit configured to acquire a second luminance Y2 which is a luminance of a background of the visual object;
   a second chromaticity acquiring unit configured to acquire a second chromaticity U2 which is a chromaticity of the background; and
   an index contrast calculation unit configured to calculate an index contrast C expressed by following equation (2) by using the first luminance Y1, the second luminance Y2, the first chromaticity U1 and the second chromaticity U2, $$C=K(Y1U1-Y2U2) \quad (2),$$

where K is a constant.

3. An index calculation apparatus comprising:
a first luminance acquiring unit configured to acquire a first luminance Y1 which is a luminance of a visual object displayed by a display apparatus;
a first chromaticity acquiring unit configured to acquire a first chromaticity U1 which is a chromaticity of the visual object;
a second luminance acquiring unit configured to acquire a second luminance Y2 which is a luminance of a background of the visual object;
a second chromaticity acquiring unit configured to acquire a second chromaticity U2 which is a chromaticity of the background; and
an index contrast calculation unit configured to calculate an index contrast C expressed by following equation or an inverse of the index contrast C by using the first luminance Y1, the second luminance Y2, the first chromaticity U1 and the second chromaticity U2, $$C=(Y1U1)/(Y2U2) \quad (3).$$

4. An index calculation apparatus comprising:
a first luminance acquiring unit configured to acquire a first luminance Y1 which is a luminance of a visual object displayed by a display apparatus;
a first chromaticity acquiring unit configured to acquire a first chromaticity U1 which is a chromaticity of the visual object;
a second luminance acquiring unit configured to acquire a second luminance Y2 which is a luminance of a background of the visual object;
a second chromaticity acquiring unit configured to acquire a second chromaticity U2 which is a chromaticity of the background; and
an index contrast calculation unit configured to calculate an index contrast C expressed by following equation or an inverse of the index contrast C by using the first luminance Y1, the second luminance Y2, the first chromaticity U1 and the second chromaticity U2, $$C=[(Y1U1)-(Y2U2)]/[(Y1U1)+(Y2U2)] \quad (4).$$

5. A display system comprising:
a display apparatus; and
an index calculation apparatus including:
a first luminance acquiring unit configured to acquire a first luminance Y1 which is a luminance of a visual object displayed by a display apparatus;
a first chromaticity acquiring unit configured to acquire a first chromaticity U1 which is a chromaticity of the visual object;
a second luminance acquiring unit configured to acquire a second luminance Y2 which is a luminance of a background of the visual object;
a second chromaticity acquiring unit configured to acquire a second chromaticity U2 which is a chromaticity of the background; and
an index contrast calculation unit configured to calculate an index contrast C expressed by following equation or an inverse of the index contrast C by using the first luminance Y1, the second luminance Y2, the first chromaticity U1 and the second chromaticity U2, $$C=[(Y1U1)-(Y2U2)]/[(Y1U1)+(Y2U2)] \quad (4),$$

wherein
the display apparatus is configured to display characters as the visual object; and
the display apparatus includes a size calculation unit configured to calculate a size of the characters depending on the index contrast C.

6. The display system according to claim 5, wherein
the display apparatus is provided with a plurality of light sources producing different colors of light; and
the display apparatus is configured to mix the light of the plurality of light sources, thereby displaying the visual object.

* * * * *